(12) United States Patent
Shibata

(10) Patent No.: US 7,106,963 B2
(45) Date of Patent: Sep. 12, 2006

(54) ELECTRONIC EQUIPMENT

(75) Inventor: Masayoshi Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 10/949,239

(22) Filed: Sep. 27, 2004

(65) Prior Publication Data

US 2005/0068715 A1    Mar. 31, 2005

(30) Foreign Application Priority Data

Sep. 30, 2003    (JP) .............................. 2003/341253

(51) Int. Cl.
  *G03B 17/00*    (2006.01)
  *H05F 3/02*    (2006.01)
(52) U.S. Cl. ...................... 396/535; 361/212
(58) Field of Classification Search ................ 396/283, 396/423, 439, 535, 542; 361/212
  See application file for complete search history.

(56) References Cited

U.S. PATENT DOCUMENTS

| | | | | |
|---|---|---|---|---|
| 4,318,604 A | * | 3/1982 | Kobori ........................ 396/535 |
| 4,445,765 A | * | 5/1984 | Yamamoto ................... 396/271 |
| 4,597,659 A | * | 7/1986 | Suda et al. .................. 396/147 |
| 4,758,855 A | * | 7/1988 | Tamamura et al. ......... 396/536 |
| 4,985,719 A | * | 1/1991 | Tsurukawa et al. ......... 396/529 |
| 6,249,631 B1 | * | 6/2001 | LeVey et al. ............... 385/134 |
| 6,731,341 B1 | * | 5/2004 | Uchiyama ................... 348/374 |
| 6,836,292 B1 | * | 12/2004 | Bean et al. .................. 348/335 |

* cited by examiner

*Primary Examiner*—W. B. Perkey
(74) *Attorney, Agent, or Firm*—Fitzpatrick, Cella, Harper & Scinto

(57) ABSTRACT

Electronic equipment of which the assembling process is easy is disclosed. The electronic equipment comprises a first member with electric conductivity, a second member with electric conductivity and a third member with elasticity. The first member is fixed to an insulation member. A part of the first member protrudes outside of the electronic equipment. The third member biases the second member so as to contact with the insulation member. The first member is connected to a conductive portion of the electronic equipment through the third member such that the first member is grounded.

6 Claims, 4 Drawing Sheets

ELECTRONIC EQUIPMENT

BACKGROUND OF THE INVENTION

1. Field of the Invention

The present invention relates to electronic equipment such as an image-taking apparatus.

2. Description of the Related Art

Conventionally, the electronic equipment such as the image-taking apparatus is provided with a metallic strap mount in order to easily carry the electronic equipment and repress the electronic equipment from being lost. Also, by using a sounding body being capable of producing a sound or making an operation sound, specific information is outputted to a user, thereby contributing to the convenience feature of the image-taking apparatus and improving its operability.

Here, the metallic strap mount is fixed to a metal member or a metal exterior member such as a grounded chassis through a screw, to repress static electricity or electrostatic noise from penetrating into a circuit in the electronic equipment.

In addition, the sounding body is directly fixed to an exterior component etc. having a sound-emitting portion by an adhesive, such that a sound produced is not spread to other parts in the image-taking apparatus. In order to repress the generation of static electricity, the chassis is closely in contact with the periphery of the sounding body to ground the static electricity.

However, in the structure of the above-mentioned metallic strap mount, in case of fixing the metallic strap mount to an insulating member such as a mold exterior member, the chassis must be provided to the fixed location of the metallic strap mount. As a result, the space in the image-taking apparatus, for example, the space in the thickness direction of the image-taking apparatus is limited by the chassis, which deteriorates the appearance of the electronic equipment.

Also, in case of fixing the sounding body by an adhesive, the sounding body must be pressed and fixed by a fixing member such as a clothespin in order to repress the sounding body from separating while the adhesive is being dried. However, in case of fixing the sounding body by the above-mentioned method, the exterior member is often scratched by the fixing member such as the clothespin or the next operation must be delayed until the adhesive is completely dried, thus deteriorating the working efficiency.

SUMMARY OF THE INVENTION

One aspect of electronic equipment according to this invention comprises, a first member with electric conductivity, a second member with electric conductivity and a third member with elasticity. The first member is fixed to an insulation member. A part of the first member protrudes outside of the electronic equipment. Here, the third member biases the second member so as to contact with the insulation member. The first member is connected to a conductive portion of the electronic equipment through the third member such that the first member is grounded.

Another aspect of electronic equipment according to this invention comprises, an optical member through which a light flux forming an image on an image pickup element passes, an operation member which is operated by a user to carry out image-taking operation, a first member with electric conductivity and a second member with electric conductivity. The first member is fixed to an insulation member as an exterior member of the electronic equipment and includes an opening for mounting a predetermined member. A part of the first member protrudes outside of the electronic equipment. The second member is provided in the electronic equipment and is grounded. Here, the first member is electrically connected to the second member.

The advantages and characteristics of the electronic equipment according to the present invention will be clarified by the description of the following embodiments with reference to the accompanying drawings.

DESCRIPTION OF THE PREFERRED EMBODIMENT

Embodiment 1

An image-taking apparatus (electronic equipment) according to Embodiment 1 of the present invention will be explained with reference to FIGS. 1 to 4.

Figure 1:
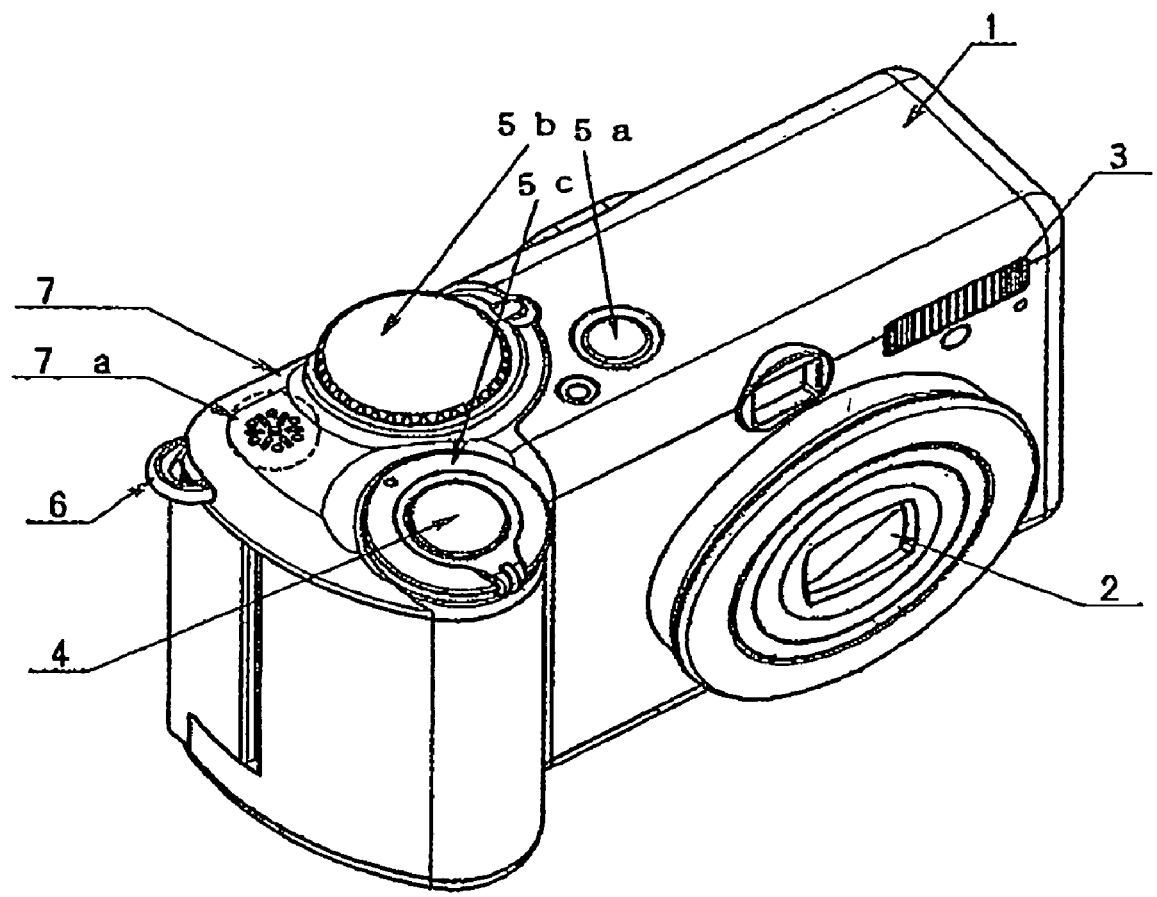
FIG. 1 shows an external perspective view of an image-taking apparatus according to Embodiment 1 of the present invention.

FIG. 1 shows a front perspective view of the image-taking apparatus according to Embodiment 1. In FIG. 1, a main body 1 of the image-taking apparatus has, at its front surface, a lens barrel 2 including an image-taking lens (not shown). The focal length of the image-taking optical system can be varied by retracting or extending the lens barrel 2 in the direction of an optical axis.

In addition, the main body 1 is provided with, for example, an image pickup element such as a CCD sensor or CMOS image sensor for photoelectrically converting an optical image to an electrical signal, an optical low pass filter, and a control circuit for controlling the overall operation in the image-taking apparatus. Here, an object light flux transmitting the image-taking lens in the lens barrel 2 forms an image on the image plane of the image pickup element.

On the right upper side of the front surface of the main body 1, a window portion 3 of an illuminating unit is provided, in which the light is emitted as needed, for example, in the case of the amount of light being deficient when taking an image.

A top surface of the main body 1 is provided with a release button 4. By half-pressing the release button 4, image-taking preparatory operations including focusing and photometry operations are started. By fully pressing the release button 4, an image-taking operation, that is, recording of an image data (still image data) taken by using the image pickup element in a recording medium is started.

In addition, on the top surface of the main body 1, various operation members 5a to 5c are provided. Here, the operation member 5a is the member operated in order to turning on/off a power supply of the main body 1, the operation member 5b is the member rotated in order to set an image-taking mode, etc., and the operation member 5c is the member rotated in order to carry out zooming operation of the image-taking optical system.

The surface of the main body 1 is formed with a mold exterior member (insulating member) 7, and an opening 7a is formed at the location corresponding to the top surface of the main body 1 in the exterior member 7. In the main body 1, a below-mentioned sounding body (a second member) is provided, and a sound of the sounding body is outputted to the outside of the main body 1 through the opening 7a.

The exterior member 7 is provided with a metallic strap mount (a first member) 6 for mounting a strap, and the surface of the metallic strap mount 6 is subjected to the process for obtaining electric conductivity.

On the other hand, on the rear surface of the main body 1, a liquid crystal display unit (not shown) is located, and an image data (object image) taken by using the image pickup element is displayed (electronic view finder) or the image data taken is replayed on the liquid crystal display unit.

Next, the internal structure of the image-taking apparatus according to the present embodiment will be explained with reference to FIGS. 2 to 4.

Figure 2:
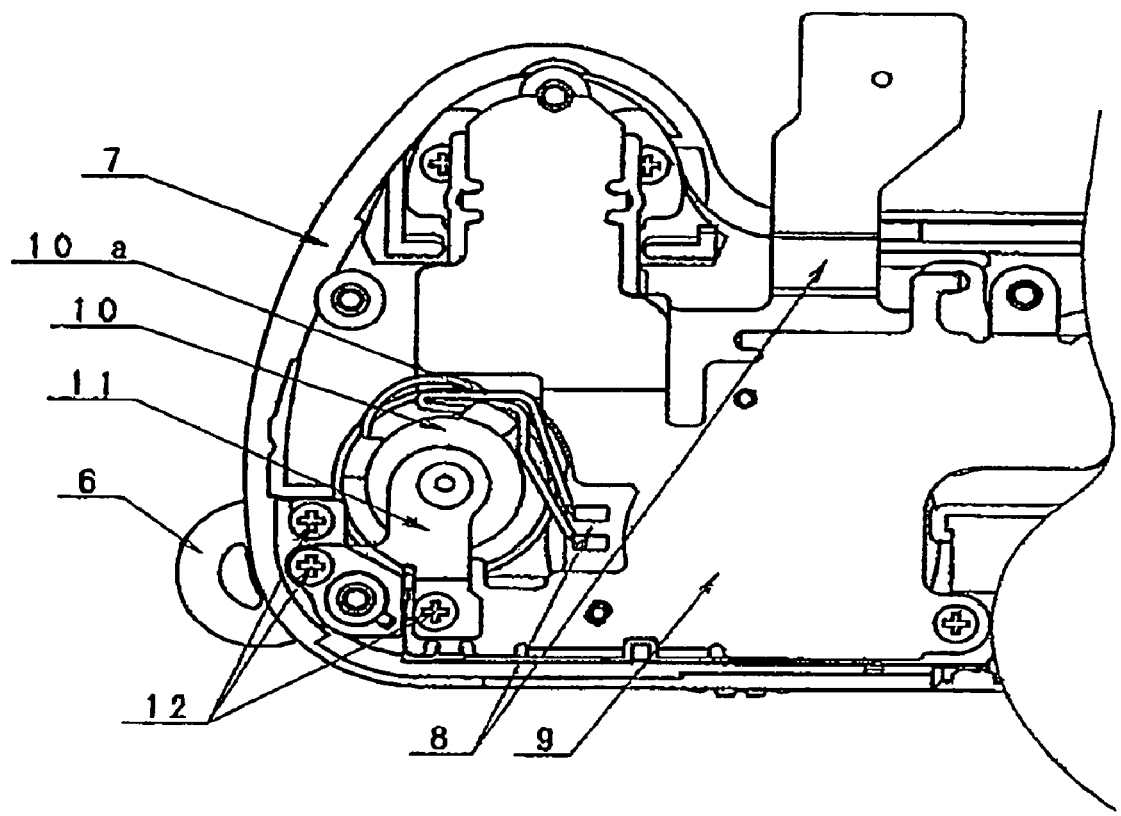
FIG. 2 shows a horizontal cross-sectional view of the image-taking apparatus according to Embodiment 1.
Figure 3:
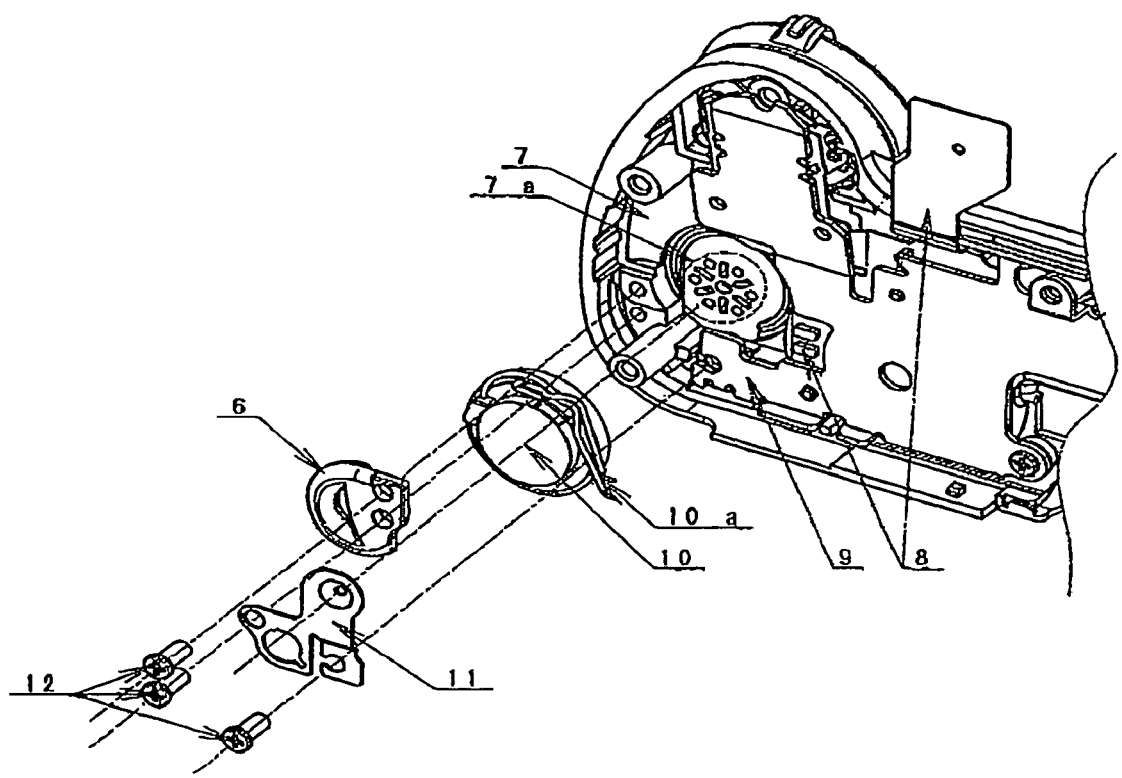
FIG. 3 shows an exploded perspective view of the structure shown in FIG. 2 of the image-taking apparatus according to Embodiment 1.
Figure 4:
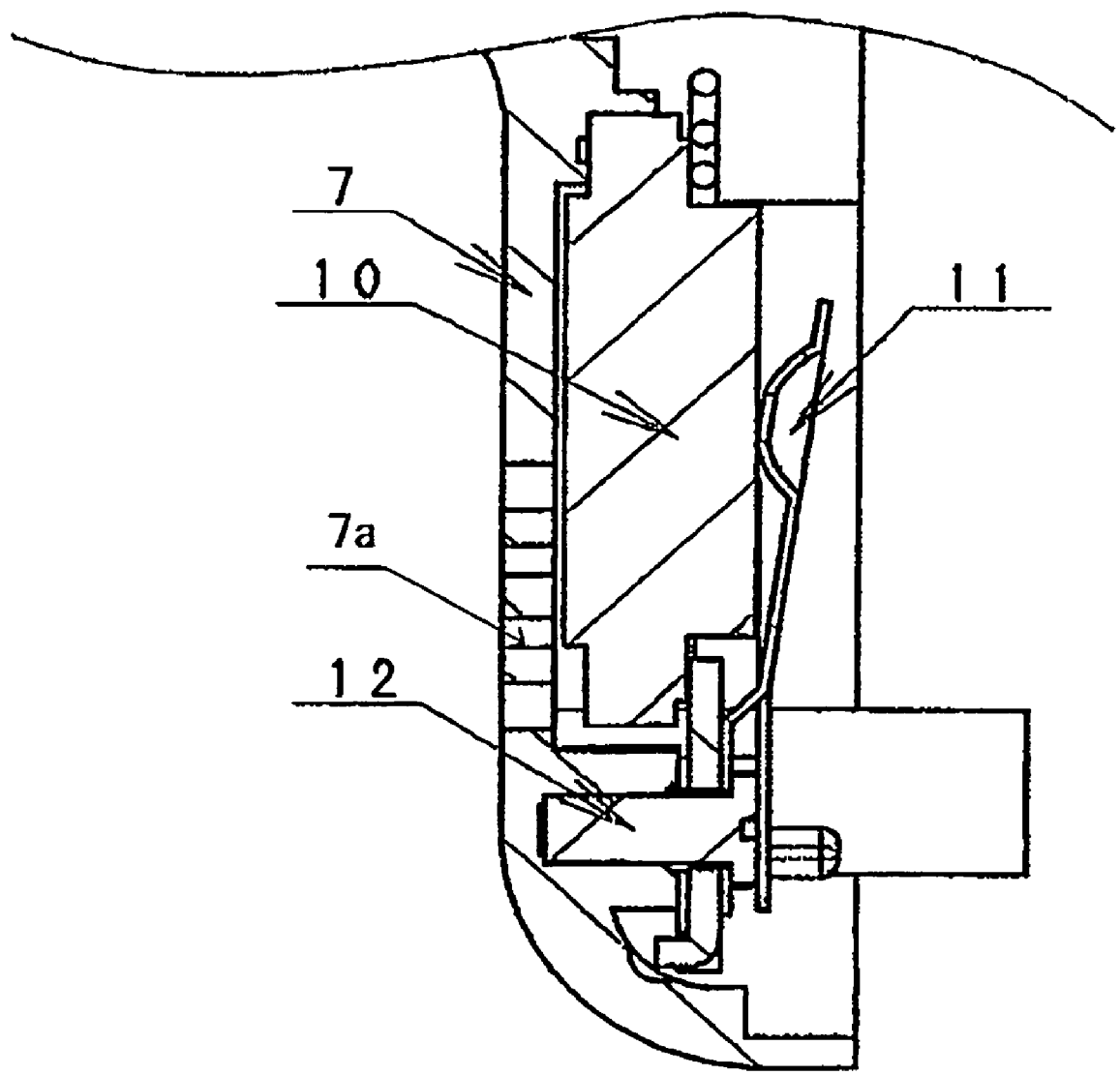
FIG. 4 shows a vertical cross-sectional view of the peripheral structure including a sounding body.

Here, FIG. 2 shows a horizontal cross-sectional view of the image-taking apparatus according to the present embodiment, and FIG. 3 shows an exploded perspective view of the image-taking apparatus corresponding to the portion shown in FIG. 2.

Inside the mold exterior member 7, a press-type switch for converting the operations of the release button 4 and the operation members 5a to 5b to electric signals, a flexible printed circuit board 8 on which the control circuit of the image-taking apparatus is mounted, and a chassis (a conductive portion) 9 made of plate-shaped metal material for supporting the flexible printed circuit board 8 and for receiving the pressure from the release button 4 and the operation members 5a to 5b are provided. Here, the chassis 9 is grounded through the GND terminal of the main body 1.

The sounding body 10 is fixed at a specific locating portion in the exterior member 7 by an adhesive. The lead wire 10a of the sounding body 10 is electrically and mechanically connected to the flexible printed circuit board 8 by soldering. Thereby, the sounding body 10 can make a specific sound by receiving a control signal from the control circuit (not shown) mounted on the flexible printed circuit board 8.

The metallic strap mount 6 having electric conductivity is fixed to the exterior member 7 by two screws 12, and a part of the metallic strap mount 6 is protruded to the outside of the exterior member 7. The leaf spring member (a third member) 11 is fixed to the exterior member 7 through the two screws 12. One of the two screws 12 is also used to fix the metallic strap mount 6.

Here, the leaf spring member 11 is fixed to the exterior member 7 through the screw 12. Therefore, as shown in FIG. 4, the leaf spring member 11 biases the sounding body 10 toward the side of the exterior member 7, as shown in FIG. 4, and comes into contact with the metallic strap mount 6 and the chassis 9.

As described above, since the leaf spring member 11 biases the sounding member 10 toward the side of the exterior member 7 with the elastic force (spring force), it serves as a presser when fixing the sounding body 10 to the exterior member 7 by the adhesive. In other words, since the sounding member 10 can adhere to the exterior member 7 by only fixing the leaf spring member 11 to the exterior member 7, the sounding body 10 can be repressed from separating with respect to the exterior member 7.

Here, conventionally, the sounding body is fixed by using a fixing member such as a clothespin, and then the fixing member is removed after the adhesive is completely dried. But, in the present embodiment, since only the leaf spring member 11 is mounted, the assembly operation of the image-taking apparatus can become easier.

In addition, by increasing the biasing force applied to the sounding body 10 by the leaf spring member 11, the sounding member 10 may be fixed to the exterior member 7 without using the adhesive. In this case, since the process for coating the adhesive is unnecessary, the manufacturing process of the image-taking apparatus becomes easier.

Further, since the metallic strap mount 6 is connected to the chassis 9 through the leaf spring member 11, the chassis 9 need not be positioned to the location of the metallic strap mount 6 in order to directly connect the metallic strap mount 6 to the chassis 9. That is, the leaf spring member 11 has a function for discharging the static electricity generated in the image-taking apparatus together with the chassis 9 and the metallic strap mount 6.

In the present embodiment, by providing the leaf spring member 11 having the two functions, as mentioned above, the working efficiency of assembly process of the image-taking apparatus can be improved and also the space inside the image-taking apparatus can be efficiently utilized.

In addition, although the metallic strap mount is described in the above-mentioned embodiment, the present invention is not limited thereto, and a component such as a makeup component having electric conductivity can be used instead of the metallic strap mount. Also, although the case of using the sounding body is described in the above-mentioned embodiment, the present invention is not limited thereto and can be applied to a case using a functional component which requires protection against static electricity including a sound collector such as a microphone etc. or a small-size liquid crystal display unit etc. instead of the sounding body.

According to the above-mentioned embodiment, the sounding body 10 can be close to the exterior member 7 by biasing the sounding body 10 toward the exterior member 7 made of the insulating material by the leaf spring member 11. Further, the static electricity generated in the image-taking apparatus can be removed by connecting the metallic strap mount 6 to the chassis 9 using the leaf spring member 11 such that the metallic strap mount is grounded. At this time, since the leaf spring member 11 is used, the size of the chassis 9 need not be increased and the space inside the image-taking apparatus can be efficiently utilized, compared to the case of directly connecting the chassis 9 to the metallic strap mount 6.

Here, in case of attaching the sounding body 10 to the exterior member 7, the sounding body 10 can be repressed from being separated by the bias force due to the leaf spring member 11 during the attaching process, and the member constituting the image-taking apparatus (for example, the exterior member 7) will not be scratched, unlike the conventional case of using the clothespin.

While a preferred embodiment has been described, it is to be understood that modification and variation of the present invention may be made without departing from the scope of the following claims.

"This application claims priority from Japanese Patent Application No. 2003-341253 filed on Sep. 30, 2003, which is hereby incorporated by reference herein."

What is claimed is:

1. Electronic equipment, comprising:
    a first member with electric conductivity, which is fixed to an insulation member, a part of the first member protrudes outside of the electronic equipment;
    a second member with electric conductivity; and a third member with elasticity;
wherein the third member biases the second member so as to contact with the insulation member, and the first member is connected to a conductive portion of the electronic equipment through the third member such that the first member is grounded.

2. The electronic equipment according to claim 1, wherein the insulation member is an exterior member of the electronic equipment.

3. The electronic equipment according to claim 1, wherein the first member is made of a metal material, and is a mounting member to which a strap is mounted.

4. The electronic equipment according to claim 1, wherein the second member is adhered to the insulation member.

5. Electronic equipment comprising:
an optical member through which a light flux forming an image on an image pickup element passes;
an operation member which is operated by a user to carry out image-taking operation;
a first member with electric conductivity, which is fixed to an insulation member as an exterior member of the electronic equipment and includes an opening for mounting a predetermined member, a part of the first member protrudes outside of the electronic equipment; and
a second member with electric conductivity, which is provided in the electronic equipment and is grounded;
wherein the first member is electrically connected to the second member.

6. The electronic equipment according to claim 5, wherein the second member receives a force generated by operation of the operation member.

* * * * *

UNITED STATES PATENT AND TRADEMARK OFFICE
CERTIFICATE OF CORRECTION

| | |
|---|---|
| PATENT NO. | : 7,106,963 B2 |
| APPLICATION NO. | : 10/949239 |
| DATED | : September 12, 2006 |
| INVENTOR(S) | : Masayoshi Shibata |

Page 1 of 1

It is certified that error appears in the above-identified patent and that said Letters Patent is hereby corrected as shown below:

On The Title Page, Item
[30] FOREIGN APPLICATION PRIORITY DATA:

"Sep. 30, 2003   (JP) ......................... 2003/341253" should read
--Sep. 30, 2003   (JP) ........................ 2003-341253--.

COLUMN 1:

Line 24, "component etc." should read --component, etc.,--.

COLUMN 2:

Line 62, "turning" should read --turn--.

COLUMN 4:

Line 33, "michrophone etc." should read --microphone, etc.,--
Line 34, "unit etc." should read --unit, etc.,--.

Signed and Sealed this

Twenty-fifth Day of December, 2007

JON W. DUDAS
*Director of the United States Patent and Trademark Office*